(12) United States Patent
Adamopoulos et al.

(10) Patent No.: US 11,855,572 B2
(45) Date of Patent: Dec. 26, 2023

(54) SYSTEM AND METHOD FOR INCREASING BRAKING PERFORMANCE UNDER MULTI-PHASE SHORTING

(71) Applicant: Nidec Motor Corporation, St. Louis, MO (US)

(72) Inventors: Nikolaos Adamopoulos, Athens (GR); Dimitrios Papathanasopoulos, Athens (GR); Nikolaos Tsakalakis, Lavrio (GR); Konstantinos Andriotis, Athens (GR); Athanasios Sarigiannidis, Athens (GR); Nekrarios Karakasis, Pierias (GR)

(73) Assignee: Nidec Motor Corporation, St. Louis, MO (US)

( * ) Notice: Subject to any disclaimer, the term of this patent is extended or adjusted under 35 U.S.C. 154(b) by 223 days.

(21) Appl. No.: 17/550,957

(22) Filed: Dec. 14, 2021

(65) Prior Publication Data

US 2023/0144377 A1     May 11, 2023

(30) Foreign Application Priority Data

Nov. 9, 2021    (GR) .............................. 20210100781

(51) Int. Cl.
     *H02P 3/22*      (2006.01)
     *H02P 3/04*      (2006.01)

(52) U.S. Cl.
     CPC . *H02P 3/22* (2013.01); *H02P 3/04* (2013.01)

(58) Field of Classification Search
     CPC ...... H02P 3/04; H02P 3/12; H02P 3/22; H02P 3/26; H02P 6/00; H02P 6/08; H02P 6/24;
(Continued)

(56) References Cited

U.S. PATENT DOCUMENTS 5,677,671 A    10/1997   Pabla et al.
5,914,796 A    6/1999    Selin
(Continued)

FOREIGN PATENT DOCUMENTS

CN       108032743      5/2001
JP        2009142115     6/2009
(Continued)

OTHER PUBLICATIONS

Office Action from U.S. Appl. No. 17/550,928 entitled Safety Switching System and Method for Braking Electric Motor (dated Mar. 20, 2023).

(Continued)

*Primary Examiner* — Antony M Paul
(74) *Attorney, Agent, or Firm* — Hovey Williams LLP

(57) ABSTRACT

A system for braking an electric motor. For each motor winding, a first switch is connected between the winding and electrical ground and in series with a resistor and is closeable to connect the winding to ground through the resistor, and a second switch is connected between the winding and ground and is closeable to bypass the resistor. A controller receives feedback regarding the speed and sends to the second switch a pulse width modulated signal which selectively opens and closes the second switch to connect and disconnect the resistor to achieve an optimal equivalent average stator resistance for the motor speed which results in a power transfer to the resistor and increases a braking torque as the motor slows. The pulse width modulated signal opens the second switch for a longer time when the motor speed is higher and for a shorter time when the motor speed is lower.

16 Claims, 16 Drawing Sheets

(58) Field of Classification Search
CPC .... H02P 6/32; H02P 7/29; H02P 21/00; H02P 21/20; H02P 21/22; H02P 21/30; H02P 23/07; H02P 25/00; H02P 25/062; H02P 25/064; H02P 25/03; H02P 25/107; H02P 27/00; H02P 27/04; H02P 27/06; H02P 27/08; B60L 7/14; B60L 15/2009; B60L 2220/12; B60L 2240/12; B60L 2240/421; B60L 2240/423; B60L 2240/441; B60L 2240/443; B60L 2270/36; B60L 2200/26

See application file for complete search history.

(56) References Cited

U.S. PATENT DOCUMENTS

| | | | |
|---|---|---|---|
| 9,114,536 | B2 | 8/2015 | Sussman |
| 9,493,087 | B2 | 11/2016 | Leary |
| 9,614,466 | B2 | 4/2017 | Usselman et al. |
| 2005/0179416 | A1 | 8/2005 | Iribe et al. |
| 2010/0185357 | A1 | 7/2010 | Mizumachi |
| 2012/0041855 | A1 | 2/2012 | Sterling et al. |
| 2013/0220726 | A1 | 8/2013 | Satou et al. |
| 2016/0141865 | A1 | 5/2016 | Drake et al. |
| 2018/0069493 | A1 | 3/2018 | Roberts |
| 2019/0050697 | A1 | 2/2019 | Meng et al. |
| 2020/0041609 | A1 | 2/2020 | Ames et al. |
| 2020/0070032 | A1 | 3/2020 | Orady et al. |
| 2020/0389103 | A1 | 12/2020 | Trencseni et al. |
| 2021/0084812 | A1 | 3/2021 | Matus et al. |
| 2021/0206279 | A1 | 7/2021 | North et al. |
| 2021/0210965 | A1 | 7/2021 | Roumi et al. |
| 2023/0079247 | A1 | 3/2023 | Moloney et al. |

FOREIGN PATENT DOCUMENTS

| | | | | |
|---|---|---|---|---|
| JP | 2021016224 A | * | 2/2021 | ............... H02P 3/22 |
| KR | 1020100055920 | | 5/2010 | |
| WO | 2008062601 | | 5/2008 | |

OTHER PUBLICATIONS

Mauer, Thomas "TI Designs: TIDA-01487—Isolated CAN FD Repeater Reference Design," Texas Instruments Incorporated (2018).

Office Action from U.S. Appl. No. 17/550,868 Apparatus and Method for Arbitrating Optical Communication Between Can Buses (dated May 4, 2023).

International Search Report and Written Opinion for PCT Application No. PCT/US2022/049302 (dated Mar. 21, 2023).

* cited by examiner

| Safety Control Inputs | Safety Brake Control Inputs | STO Status | 3-Phase Short Status | Electromechanical Brake Status |
|---|---|---|---|---|
| High | High | Disable | Disable | Released |
| Low | High | Active | Active | Engaged after a preset delay |
| Float | High | Active | Active | Engaged after a preset delay |
| High | Low | Disable | Disable | Engaged |
| Low | Low | Active | Active | Engaged |
| Float | Low | Active | Active | Engaged |
| High | Float | Disable | Disable | Released |
| Low | Float | Active | Active | Engaged after a preset delay |
| Float | Float | Active | Active | Engaged after a preset delay |

| Condition | Input Signal | Circuit 1 Output | Circuit 2 Output | Digital Feedback |
|---|---|---|---|---|
| Healthy | 0 | 0 | 0 | 1 |
| Healthy | 1 | 1 | 1 | 1 |
| Short Circuit Fault | 0 | 0 | 0 | 1 |
| Short Circuit Fault | 1 | 1 | 0 | 0 |
| Open Circuit Fault | 0 | 1 | 0 | 0 |
| Open Circuit Fault | 1 | 1 | 1 | 1 |

| Input_CH1 | Input_CH2 | Short Circuit Fault | Open Circuit Fault | Digital Feedback |
|---|---|---|---|---|
| High | High | Yes | X | Low |
| Low | High | No | Yes (Channel 1) | Low |
| High | Low | No | Yes (Channel 2) | Low |
| X | X | No | No | High |

Fig. 8B.

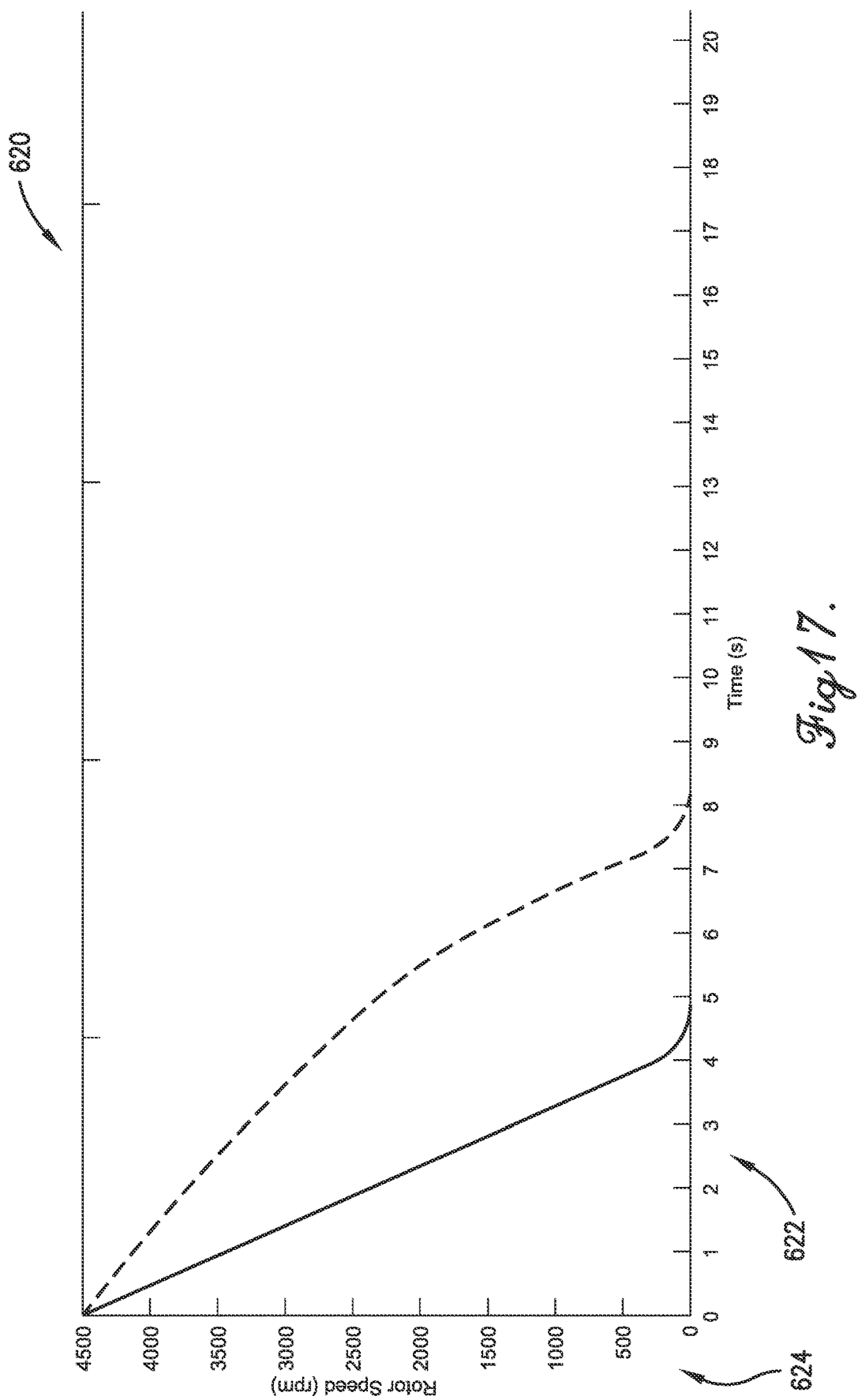

SYSTEM AND METHOD FOR INCREASING BRAKING PERFORMANCE UNDER MULTI-PHASE SHORTING

FIELD

The present invention relates to systems and methods for braking electric motors, and more particularly, embodiments concern a system and method for improving braking under multi-phase shorting of an electric motor by using braking resistors and pulse width modulating bypass switches to adapt an equivalent average stator resistance to optimize braking torque through most or all of the deceleration speed range.

BACKGROUND

It is sometimes desirable or necessary to brake electric motors in order to slow or stop them, and various systems and methods for braking electric motors are known. However, such systems often include single points of failure that may fail without warning if or when they do fail. Safety is a particular concern in the operation of mobile robots, automatic guided vehicles, and other motorized machinery if the robot, vehicle, or other machine and its load cannot reliably be slowed or stopped in a timely manner.

One way to brake an electric motor is to short the motor windings to ground in order to absorb a portion of the motor energy. However, a conventionally implemented multi-phase short condition at the motor windings can result in non-constant and suboptimal braking torque which varies with both motor equivalent circuit characteristics and speed.

Additionally, electric motor systems may include multiple encoders. A first encoder may be located in or on the motor and may be configured to generate and transmit first reporting signals only to a motor controller, and a second encoder may be located apart from or outside of the motor (for example, on a wheel) and may be configured to generate and transmit second reporting signals only to a safety controller. Being physically separate units, the first and second encoders must be separately certified, which increases the time and expense required for certification. Further, prior art systems simply assume that the first reporting signals match the second reporting signals.

This background discussion is intended to provide information related to the present invention which is not necessarily prior art.

SUMMARY

Embodiments address the above-described problems and limitations in the prior art, as well as other problems, by providing a system and method for improving braking under multi-phase shorting of an electric motor by employing braking resistors and pulse width modulating bypass switches to adapt an equivalent average stator resistance to optimize braking torque through most or all of the deceleration speed range.

An embodiment of the present invention may provide a multi-phase shorting system configured to brake an electric motor controlled by a motor controller. The electric motor may include a plurality of motor windings. The multi-phase shorting system may include a plurality of braking resistors, a plurality of first switches, a plurality of second switches, and an electronic controller. The plurality of braking resistors may include at least one braking resistor for each motor winding. The plurality of first switches may include at least one first switch for each motor winding, with each first switch being a normally-closed switch connected between a respective motor winding and an electrical ground and in electrical series with the braking resistor, and each first switch being configured to selectively close to connect the respective motor winding to the electrical ground through the braking resistor. The plurality of second switches may include at least one second switch for each motor winding, with each second switch being a normally-closed switch connected between a respective motor winding and the electrical ground, and the second switches being configured to selectively close to bypass the braking resistors and directly connect the motor windings to the electrical ground and thereby brake the electric motor by diverting power from the motor windings. The electronic controller may be configured to receive feedback regarding a speed of the electric motor, and based at least in part thereon, to generate and send to the second switches a pulse width modulated signal which selectively opens and closes the second switches and thereby respectively connects and disconnects the braking resistors to achieve a particular equivalent average stator resistance for the speed of the electric motor which results in a power transfer to the braking resistors and increases a braking torque through a deceleration speed range as the electric motor slows.

Various implementations of the above-described embodiment may include any one or more of the following features. The first switches and the plurality of second switches may be metal oxide semiconductor field effect transistor switches. The electronic controller may generate and send the pulse width modulated signal to open the second switches for a longer time period when the speed of the electric motor is higher and for a shorter period of time when the speed of the electric motor is lower. The multi-phase shorting system may further include a feedback system configured to communicate to the electronic controller a switch failure of one or more of the first and second switches either as a short circuit fault or an open circuit fault, wherein if the switch failure occurs then the electronic controller activates the multi-phase shorting system and an electromechanical brake system to brake the electric motor. The feedback system may be an analog feedback system configured to report a status of each of the first and second switches to the electronic controller as a first voltage indicating the switch failure has not occurred and a second voltage indicating the switch failure has occurred. Additionally or alternatively, the feedback system may be a digital feedback system configured to report a status of each of the first and second switches to the electronic controller as a high value indicating the switch failure has not occurred and a low value indicating the switch failure has occurred.

Another embodiment of the present invention may provide a system including an electric motor, a motor controller, and a multi-phase shorting system. The electric motor may include a plurality of motor windings, and the motor controller may be configured to provide power to and electronically control operation of the electric motor. The multi-phase shorting system may be configured to brake the electric motor, and may include a plurality of braking resistors, a plurality of first power switches, a plurality of second power switches, and an electronic controller. The plurality of braking resistors may include at least one braking resistor for each motor winding. The plurality of first power switches may include at least one first power switch for each motor winding, with each first power switch being a normally-closed solid state switch connected between a respective motor winding and an electrical ground and in electrical series with the braking resistor, and each first power switch being configured to selectively close to connect the respective motor winding to the electrical ground through the braking resistor. The plurality of second power switches may include at least one second power switch for each motor winding, with each second power switch being a normally-closed solid state switch connected between a respective motor winding and the electrical ground, and the second power switches being configured to selectively close to bypass the braking resistors and directly connect the motor windings to the electrical ground and thereby brake the electric motor by diverting power from the motor windings. The electronic controller may be configured to receive feedback regarding a speed of the electric motor, and based at least in part thereon, to generate and send to the second power switches a pulse width modulated signal which selectively opens and closes the second power switches and thereby respectively connects and disconnects the braking resistors to achieve a particular equivalent average stator resistance for the speed of the electric which results in a power transfer to the braking resistors and increases a braking torque through a deceleration speed range as the electric motor slows. The pulse width modulated signal may open the second power switches for a longer time period when the speed of the electric motor is higher and for a shorter period of time when the speed of the electric motor is lower.

Various implementations of the above-described embodiment may include any one or more of the following features. The first power switches and the second power switches may be metal oxide semiconductor field effect transistor switches. The multi-phase shorting system may further include a feedback system configured to communicate to the electronic controller a switch failure of one or more of the first and second power switches either as a short circuit fault or an open circuit fault, wherein if the switch failure occurs then the electronic controller activates the multi-phase shorting system and an electromechanical brake system to brake the electric motor. The feedback system may be an analog feedback system configured to report a status of each of the first and second power switches to the electronic controller as a first voltage indicating the switch failure has not occurred and a second voltage indicating the switch failure has occurred. Additionally or alternatively, the feedback system may be a digital feedback system configured to report a status of each of the first and second power switches to the electronic controller as a high value indicating the switch failure has not occurred and a low value indicating the switch failure has occurred.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 2 is a matrix of electronic input signals and the corresponding statuses of the three stages of progressive braking of FIG. 1;

FIG. 8A is a first matrix of digital signals provided by the digital feedback component of FIG. 7 and their meanings;

FIG. 8B is a second matrix of digital signals provided by the digital feedback component of FIG. 7 and their meanings;

FIG. 17 is a graph of the time for which braking is applied versus the speed of the electric motor for both the conventionally implemented multi-phase short braking (shown in dashed line) and the improved multi-phase short braking (shown in solid line).

Figure 1:
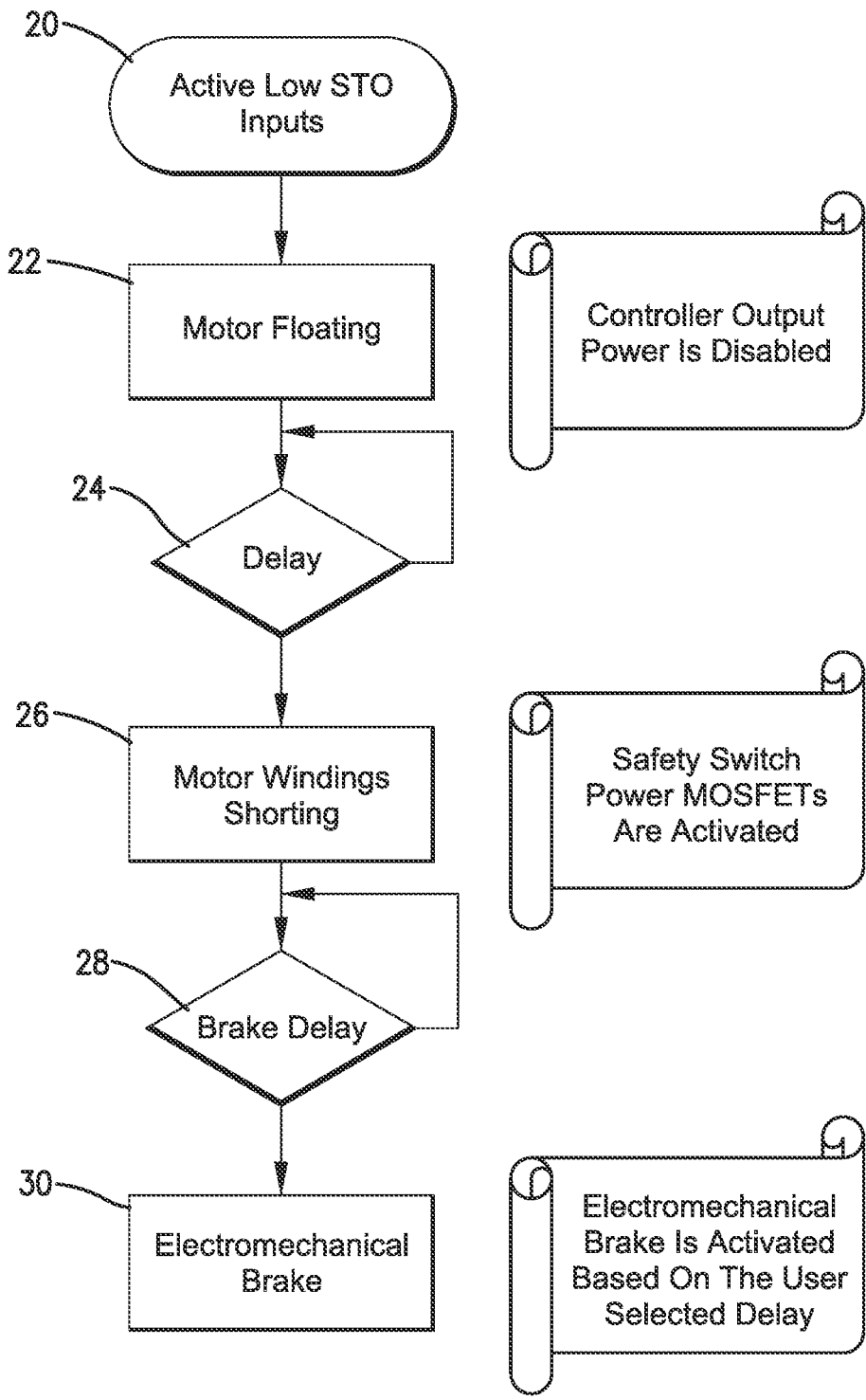
FIG. 1 is a high-level flowchart of steps in an embodiment of a method of the present invention for braking an electric motor, wherein three stages of progressive braking are shown.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly, embodiments provide a safety switching system and method including multiple independent switching units for braking an electric motor and feedback units for monitoring and reporting the operational readiness of the switching units. In more detail, embodiments provide a safety switching system and method configured to perform progressive multi-stage braking of an electric motor, including implementing multi-phase shorting using multiple independent switching units and independently controlling an electromechanical brake switch unit, and monitor for and report open and/or short circuit faults in the switches to ensure operational readiness. As used herein, "multi-phase" shall mean two or more phases, for example, three phases. Potential applications include any mobile robot, automatic guided vehicle, or other mobile device or other battery-powered direct current motor application Embodiments may provide at least three progressive stages of braking: disabling the motor controller to de-energize and allow the electric motor to coast to a stop, shorting the windings of the motor to shorten the time required for the motor to stop, and engaging an electromechanical brake to further shorten the time required for the motor to stop. The system may synchronize and otherwise manage activation of each stage to maximize operational efficacy and minimize potential for damage. Further, embodiments may provide an adjustable time delay for engaging the electromechanical brake, and further provide an override feature for immediately engaging the electromechanical brake without regard to the specified time delay. Additionally, embodiments may provide initial and periodic circuit testing to verify that elements, especially the switches, of the system are properly functioning.

Referring to FIGS. 1 and 2, embodiments may be configured to employ at least three stages of braking. First, a torque-off (STO) system may be included and configured to quickly and reliably turn off or otherwise disable the motor controller in order to remove torque-generating energy (power) from the motor, as shown in step 20. By itself, this will cause the motor to "coast" or slow to an eventual standstill due to the inherent braking effects of load torque and/or friction effect, as shown in step 22. The controller may perform a check of the STO system when the larger system is turned on and every time the STO inputs go from any state to both high. Once the STO system is verified to work, the controller can safely allow the motor to be energized.

Second, rather than rely entirely on load torque or friction to brake the motor, after a delay, shown in step 24, a multi-phase short condition may be imposed on the motor windings, as shown in step 26. This absorbs a percentage of the motor energy and shortens the time required for the motor to stop. More specifically, activation of the STO may be followed by triggering of the multi-phase shorting of the motor windings. The STO feature may be engaged so that the controller's ability to energize the motor is turned off before shorting the motor phases to prevent an over-current situation. Further, the switches may be a predefined delay after activation of the STO to avoid damaging the motor controller due to the short circuit at the controller outputs.

Third, after an adjustable time delay (of, for example, one to six seconds), as shown in step 28, an electromechanical brake may be engaged to further shorten the time required for the motor to stop, as shown in step 30. Under certain conditions, the time delay may be ignored and the electromechanical brake may be engaged immediately. Engagement of the electromechanical brake may be controlled by hardware and/or by a safety controller.

Referring particularly to FIG. 2, a matrix is shown of electronic input signals 21 and the corresponding statuses of the above-described three stages of progressive braking, specifically, the STO status 23 (wherein "active" means that the motor controller power output is off), the multi-phase short status 27 (wherein "active" means that the power switches are on, thereby shorting the motor phases to ground), and the electromechanical brake status 31.

Figure 3:
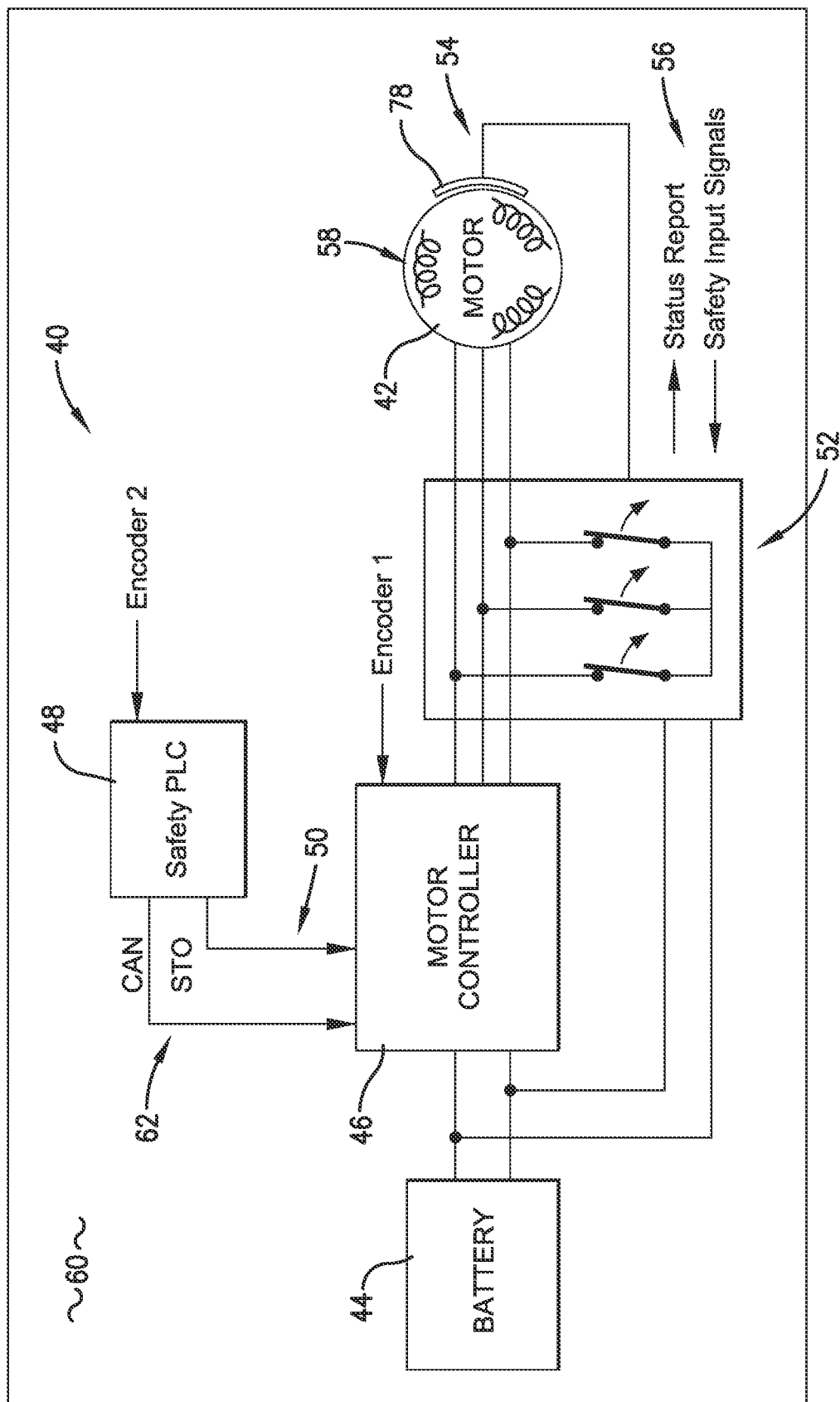
FIG. 3 is a high level component diagram of an embodiment of a safety switching system for braking an electric motor.

Referring also to FIGS. 3-10, in one embodiment, a safety switching system 40 may be provided to perform progressive multi-stage braking of an electric motor 42 and to monitor and report operational readiness of system components, particularly system switches. Referring particularly to FIG. 3, the system 40 may broadly include the electric motor 42, a battery 44, a motor controller 46 providing multi-phase power to the motor 42, a safety controller 48, an STO system 50, a multi-phase shorting system 52, an electromechanical brake system 54, and a feedback system 56. Some or all of these components may be incorporated into a mobile device 60, which may be, for example, a mobile robot or an automatic guided vehicle. The safety controller 48 may be substantially any suitable component or system for performing the functions described herein, such as a certified safety controller or a supervisory controller or supervisory system with additional monitoring and/or supervisory responsibilities.

The electric motor 42 may be configured to turn and thereby drive a load, and may include multiple windings 58. In one implementation, the motor 48 may utilize three-phase power and include three such windings 58. The battery 44 may be configured to provide direct current (DC) power to the motor controller 46 and to the safety controller 48, the multi-phase shorting system 52, and the electromechanical brake system 54. The motor controller 46 may be configured to electronically control operation of the motor 42, including power, speed, and torque, including converting the DC power provided by the battery 44 to multi-phase alternating current (AC) power and to provide single phase power to each of the windings 58 of the motor 42 in order to turn the motor 42. The motor controller 46 may be a single channel or multiple channel (for example, dual channel) device. The safety controller 48 may be configured to transmit signals to the motor controller 46, multi-phase shorting system 52, and electromechanical brake system 54, and to receive signals from the feedback system 56. Communications to and from the safety controller 48 and other components of the system 40 may be facilitated by a controller area network (CAN) bus 62.

The STO system 50 may be configured to quickly and reliably turn-off or otherwise disable the motor controller 46 in such a manner as to remove torque-generating energy from the motor 42. By itself, this will cause the motor 42 to coast to an eventual standstill due to the inherent braking effects of load torque and/or friction effect.

The safety controller 48 may perform a check of the STO system 50 whenever power is turned on and whenever the STO inputs go from any state to both high and verify the ability of the STO system 50 to disable the motor controller 46. If the STO system 50 is malfunctioning and cannot disable the motor controller 46, the safety switching system 40 may prevent the motor 42 from starting. Activation of this first stage STO braking may be followed by triggering of the second stage multi-phase shorting of the motor windings 58.

Figure 4:
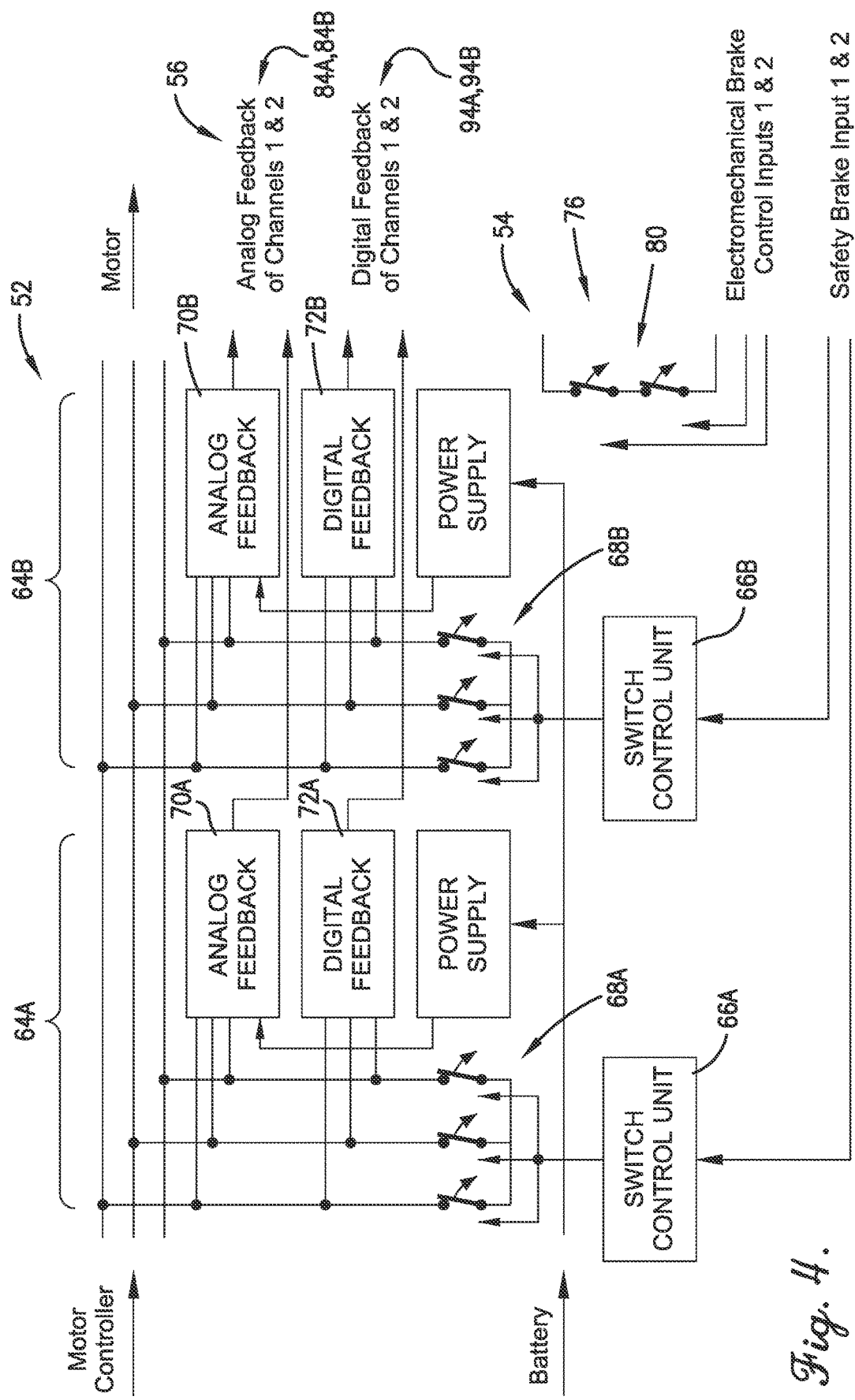
FIG. 4 is a component diagram of a multi-phase shorting system and an electromechanical brake system of the system of FIG. 3.

Referring particularly to FIG. 4, the multi-phase shorting system 52 may be configured to short the windings 58 of the motor 42 in order to absorb a percentage of the motor energy and shorten the time required for the motor 42 to stop. The multi-phase shorting system 52 may include first and second independent switching units 64A,64B electrically connected to the motor windings 58. Each of the first and second switching units 64A,64B may include a switch control unit 66A,66B, multiple normally-closed solid state switches 68A,68B electrically connected at one end to the lines carrying power from the motor controller 46 to the motor windings 58 and at the other end to electrical ground, and analog feedback units 70A,70B and/or digital feedback units 72A,72B. In various implementations, the switches 68A, 68B may be substantially any suitable power transistor, such as MOSFETs, Gallium Nitride field effect transistors (GaN-FETs), or insulated-gate bipolar transistors (IGBTs). During normal operation, each switch control units 66A,66B may receive two independent active-low control signals from the safety controller 48. The feedback units 70A,70B, 72A,72B may provide status reports to the safety controller 48 through analog and digital signals which are used to diagnose open and short circuit faults in the switches 68A, 68B.

Before activating the multi-phase shorting system 52, the STO system 50 may already be activated so that the ability of the motor controller 46 to energize the motor 42 is turned off before shorting the motor windings 58 to prevent an over-current situation. Further, the switches 68A,68B may be triggered a predefined delay after activation of the STO system 50 to avoid damaging the motor controller 46 due to the short circuit at the controller outputs. The first and second switching units 64A,64B may be configured to interrupt the power provided by the motor controller 46 to the windings 58 of the motor 42. The switching units 64A,64B may divert this power to electrical ground. Each of the first and second switching units 64A,64B may operate independent of the other so that if one fails to activate the other may not. Operation of each of the first and second switching units 64A,64B may be powered by the battery 44.

More specifically, each switch control unit 66A,66B may be configured to cause its normally-closed switches 68A, 68B to close and thereby divert power away from the respective motor windings 58. Each switch 68A,68B may be configured to connect a respective motor winding to ground. Thus, for example, in the implementation in which there are three motor windings, each switching unit 64A,64B may include first, second, and third switches.

In one implementation, the multi-phase shorting system 52 may be controlled by two independent active low safety input signals from the safety controller 48. By default, the switches 68A,68B may impose a short circuit condition when the multi-phase shorting system 52 is powered on. If both input signals to the STO system 50 are changed to high, the short circuit condition of the multi-phase shorting system 52 may be cleared and the motor 42 allowed to operate normally. Consequently, if any of these input signals becomes low or float, the multi-phase shorting system 52 may be reset to default to implement the multi-phase shorting condition.

If the battery 44 is disconnected and input power is lost to the multi-phase shorting system 52, the switches 68A,68B may not be controllable regardless of the state of the STO input signals. In this case, the electromechanical brake system 54 may be engaged to implement braking due to the presence of a crucial fault. The electromechanical brake system 54 may also be controlled by the safety controller 48 through two active low signals which deactivate the time delay at the high side switches of the electromechanical brake system 54 and allow for immediate engagement.

The electromechanical brake system 54 may be configured to mechanically brake the motor 42 to further shorten the time required for the motor 42 to stop. The electromechanical brake system 54 may operate independently of the first and second multi-phase switching units. The electromechanical brake system 54 may include a third switching unit 76 connected to an electromechanical brake 78, and analog and/or digital feedback units (not shown, but similar or identical to the analog and digital feedback units of the multi-phase shorting system 52) reporting operational conditions to the safety controller 48. The third switching unit 76 may include two normally-open switches 80 connected to the electromechanical brake 78 and controlled by two independent active-low control signals from the safety controller 48.

The safety controller 48 may wait a pre-established delay period before activating the electromechanical brake 78. In one implementation, there may be between one and six user-selectable delay periods of one second increments. Additionally or alternatively, the safety controller 48 may provide an independent input for activating the electromechanical brake 78 immediately and without regard to the pre-established a delay period.

In one implementation, the safety switch system may have two pairs of safety signals as inputs and one pair of safety signals as outputs. More specifically, two safety control inputs may trigger the multi-phase short and, after a delay, the electromagnetic brake, two safety brake control inputs may activate the electromagnetic brake without a delay, and two safety output signals may be sent to the motor controller to trigger the STO function. In a first (parallel) wiring implementation, the safety controller may send one pair of safety control signals to the safety switch, one pair of STO signals to the motor controller, and one pair of safe brake signals to the safety switch. In an alternative second (series) wiring implementation, the safety controller may send one pair of safety control signals to the safety switch and one pair of safe brake signals to the safety switch, and the safety switch sends the pair of STO signals to the motor controller. In the latter implementation, the safety switch, rather than safety controller, may control the time delay between triggering the STO function and triggering the multi-phase short function.

The feedback system 56 may be configured to allow the safety controller 48 to check operational readiness when the braking systems 50,52,54 are powered on, when the safety brake inputs are toggled, and at regular intervals if the systems are not powered off, in order to detect a failure of any of the switches 68A,68B,80 in the form of a short or open circuit condition.

Figure 5:
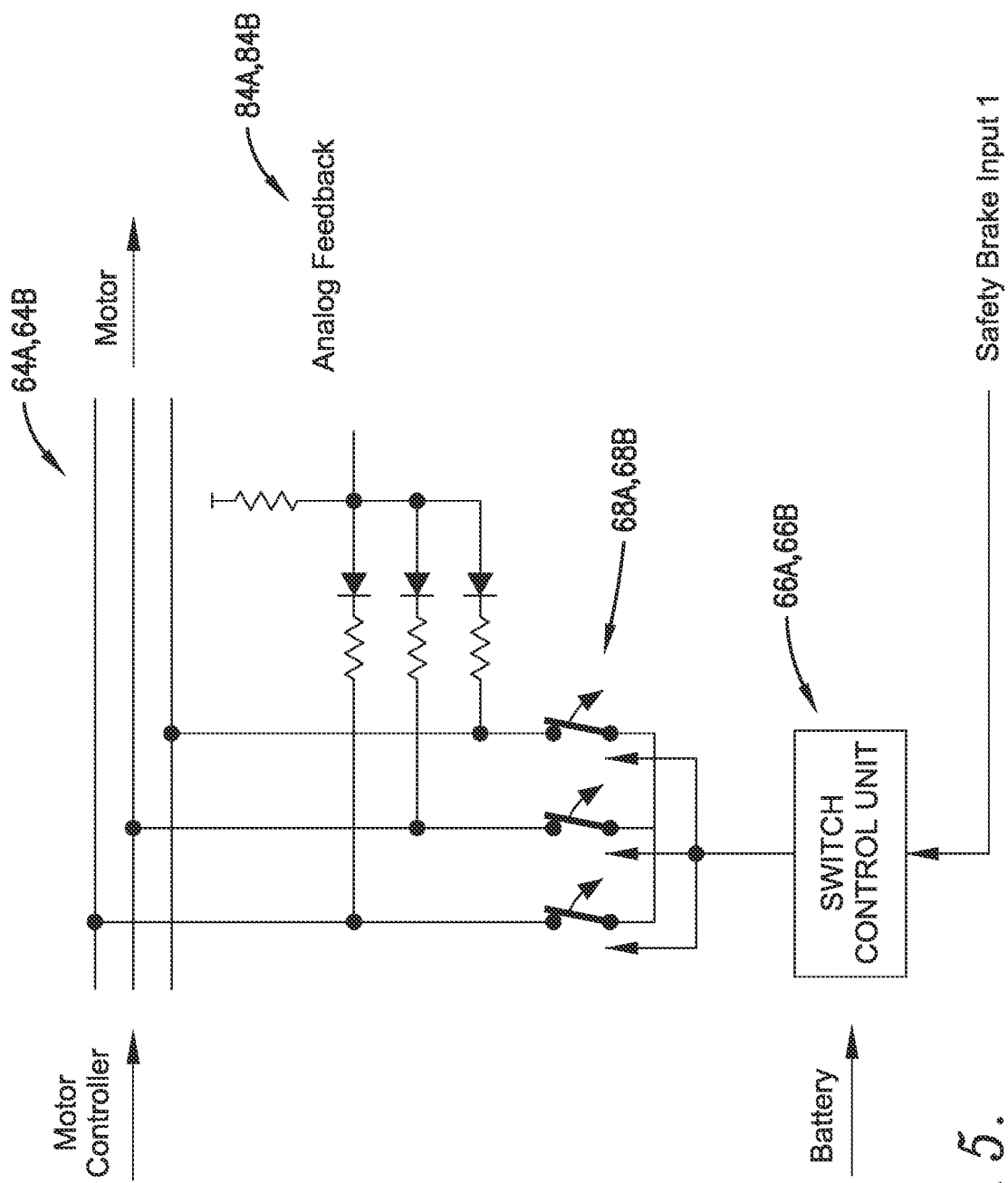
FIG. 5 is a component diagram of an implementation of an analog feedback unit component of the system of FIG. 3.
Figure 6:
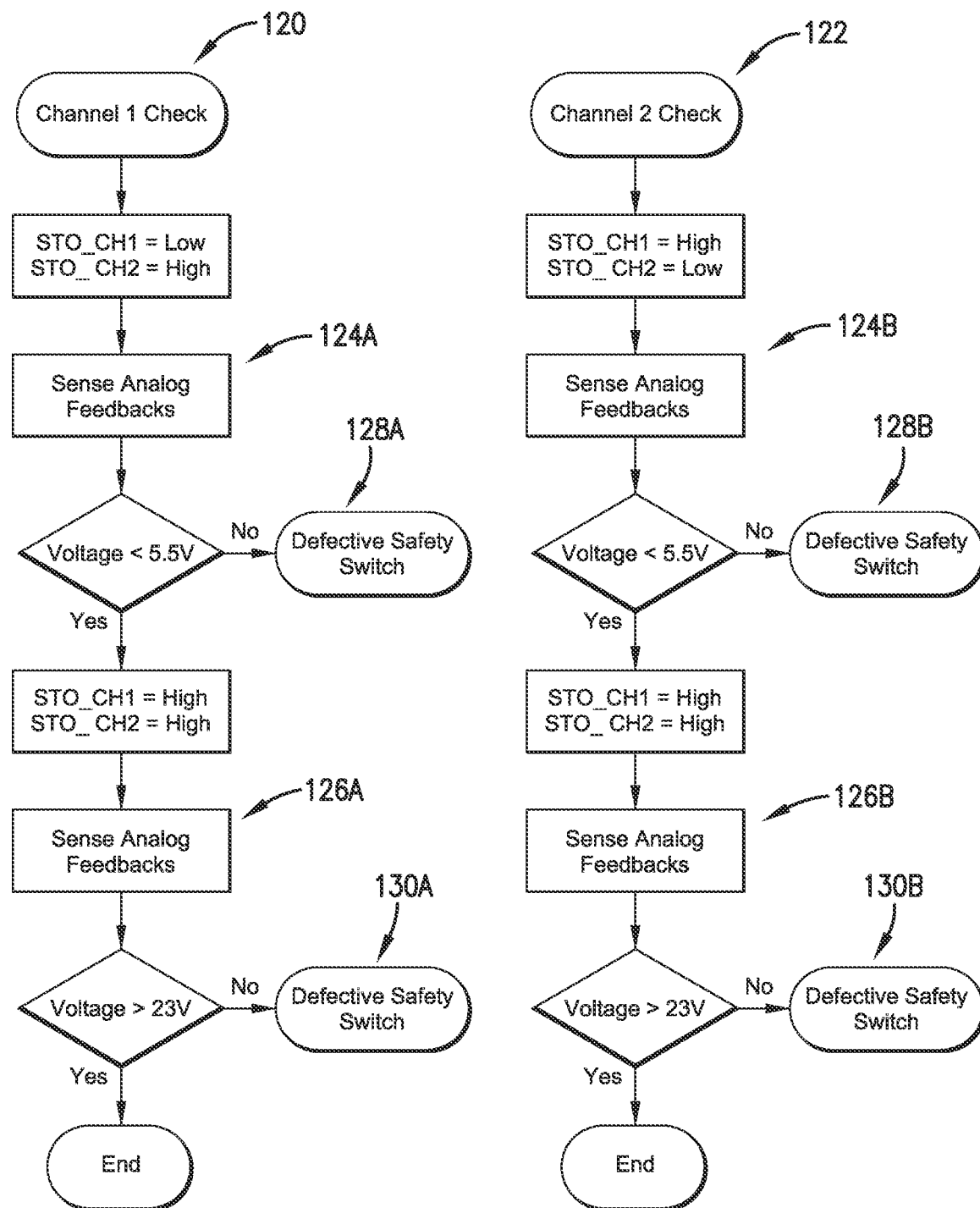
FIG. 6 is a flowchart of steps in the operation of the analog feedback unit of FIG. 5.

Referring particularly to FIGS. 5-9, in one implementation, the multi-phase shorting system 52 may report its status to the safety controller 48 as an analog and/or a digital signal. Referring particularly to FIGS. 5 and 6, as discussed, each of the first and second switching units 64A,64B may include the analog feedback unit 70A,70B configured to monitor one or more relevant operational characteristics of the switches 68A,68B and report the results via analog signals 84A,84B to the safety controller 48. Because the switches 68A,68B of the two switching channels are connected in parallel, each channel may be checked independently, as reflected in the separate paths 120,122 shown in FIG. 6. Thus, the safety input signals are used to disable the one channel in order to check the condition of the other channel through the feedback signals. Once normal operation of the one channel switches is verified, the procedure can be repeated for the other channel. Because the switches 68A,68B of each channel may be controlled by a single input signal, the condition monitoring procedure is simplified for the safety controller 48 as the feedback signals provide a general status report. In one implementation, the analog feedback reports open or short circuit faults within a wide range. The analog output signals provide the required information to detect a failure of any of the switches 68A,68B. The different voltage feedback values are read and interpreted by the safety controller (steps 124A,124B,126A, 126B) during the self-check process to identify defective switches (steps 128A,128B,130A,130B).

Figure 7:
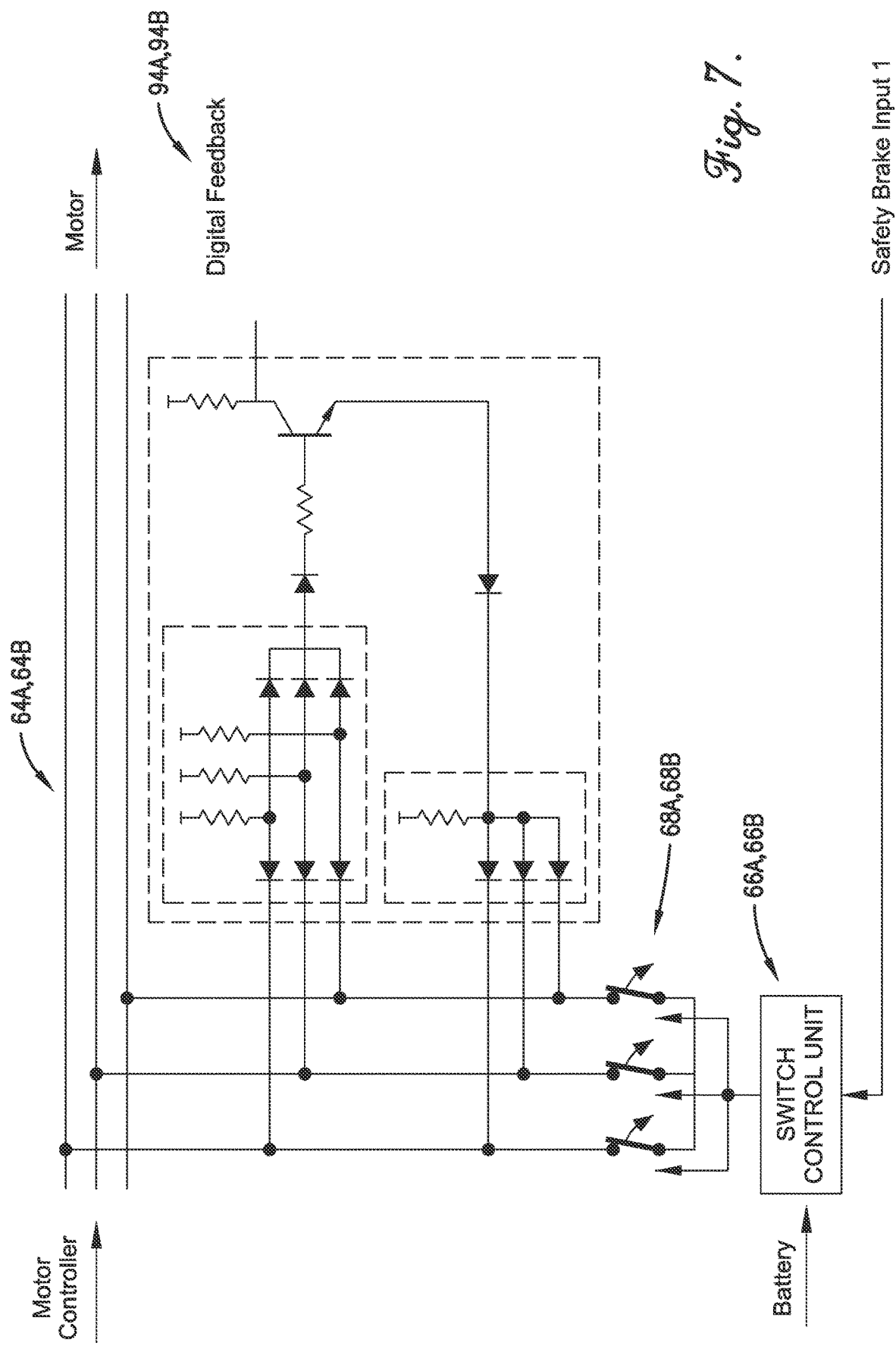
FIG. 7 is a component diagram of an implementation of a digital feedback unit component of the system of FIG. 3.
Figure 9:
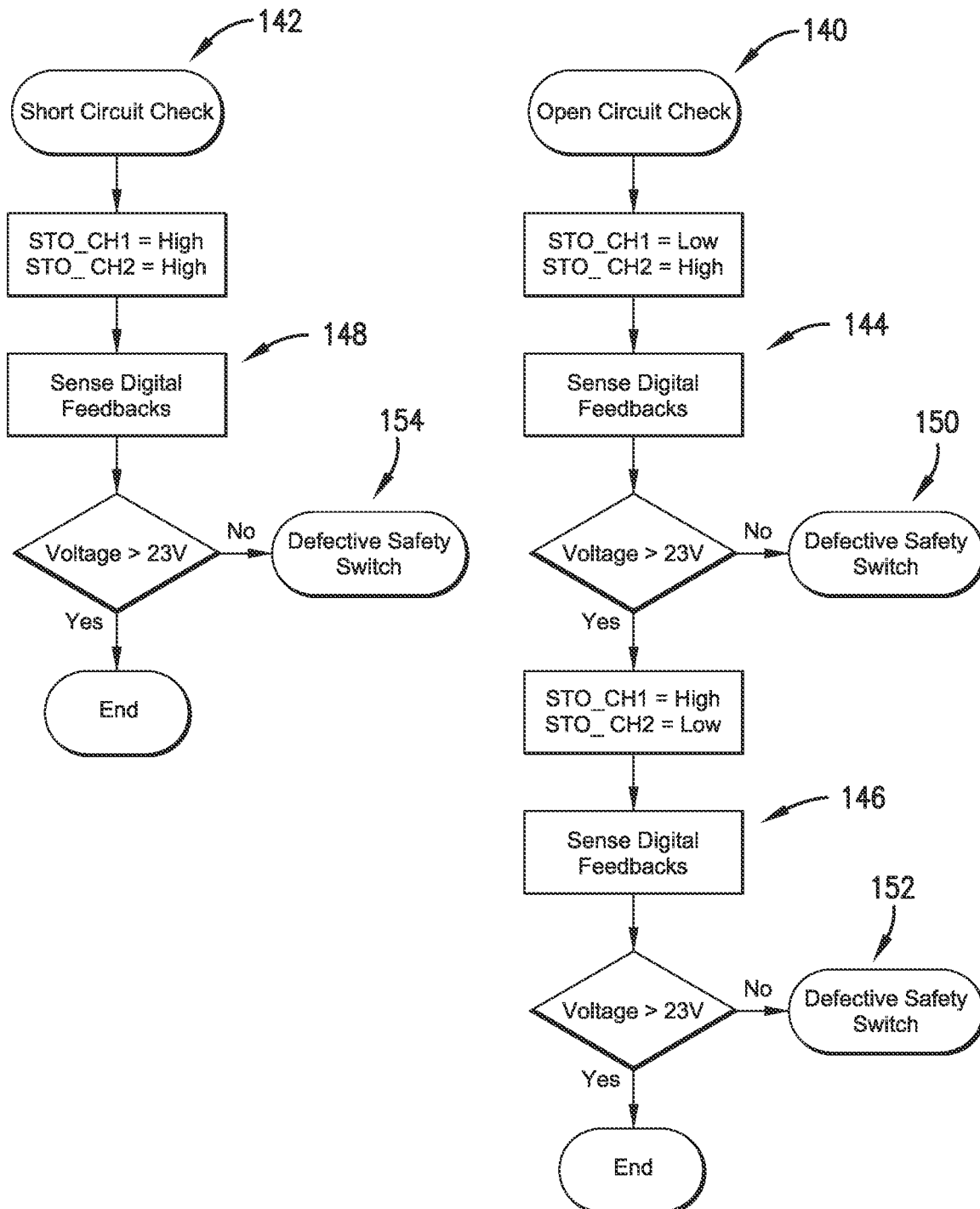
FIG. 9 is a flowchart of steps in the operation of the digital feedback unit of FIG. 7.

Additionally or alternatively, referring particularly to FIGS. 7-9, as discussed, each of the first and second switching units 64A,64B may include the digital feedback unit 72A,72B configured to monitor one or more relevant operational characteristics of the switches 68A,68B and report the results via digital signals 94A,94B to the safety controller 48. In one implementation, the digital feedback may have a normally high or first output signal (typically characterized as a "one") and report open or short circuit faults with a low or second output signal (typically characterized as a "zero"). As shown in FIGS. 7A and 7B, the two channels of the multi-phase shorting system 52 may be checked independently for the detection of an open circuit component failure (path 140) shown in FIG. 9, but can be checked simultaneously for the short circuit detection (path 142). Because the switches 68A,68B of each channel may be controlled by a single input signal, the condition monitoring procedure is simplified for the safety controller 48 as the feedback signals provide a general status report. In one implementation, the digital feedback reports open or short circuit faults within a wide range. The digital output signals provide the required information to detect a failure of any of the switches 68A,68B. The different feedback values are read and interpreted by the safety controller (steps 144,146,148) during the self-check process to identify defective switches (steps 150,152,154).

Figure 10:
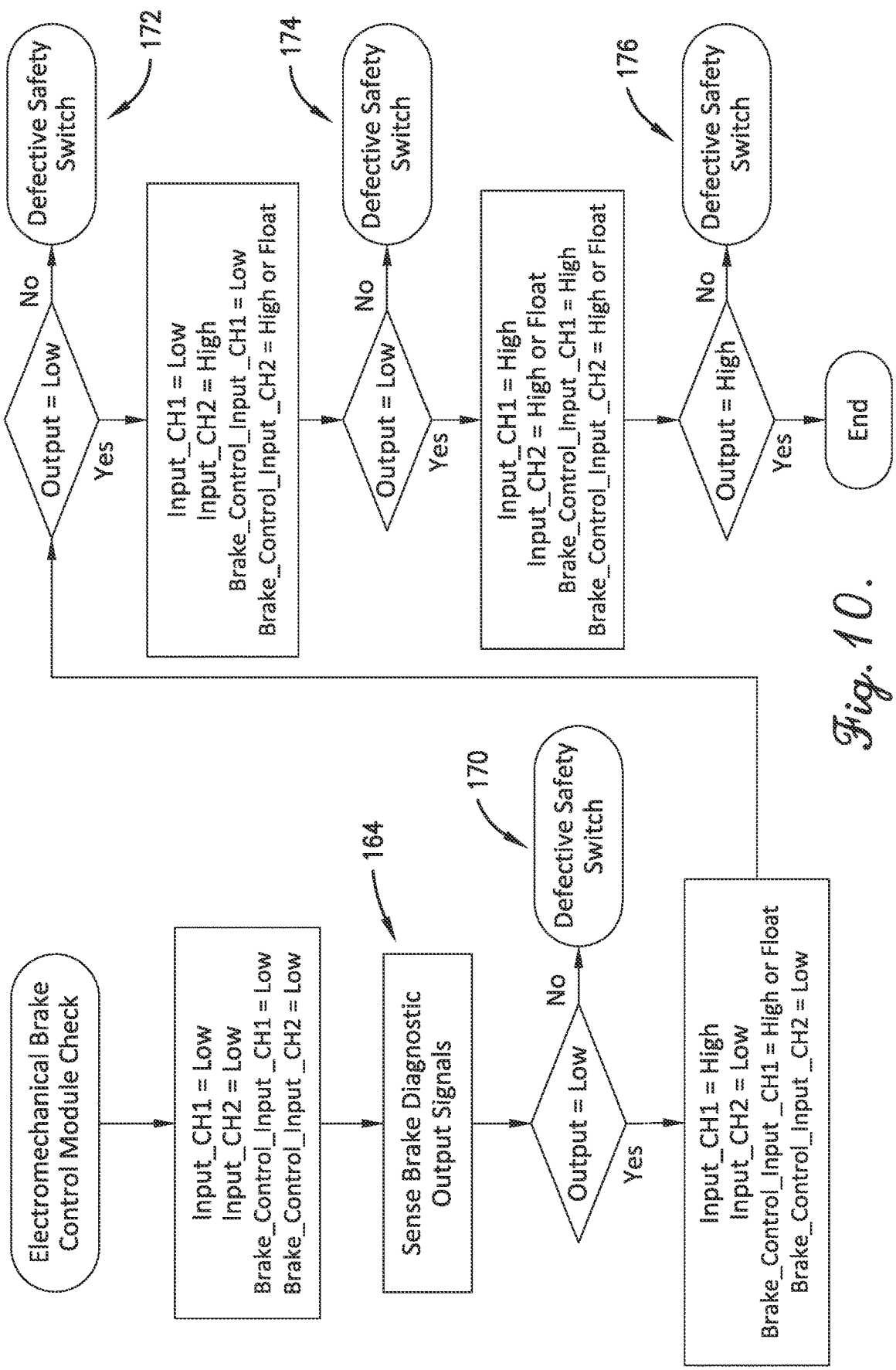
FIG. 10 is a flowchart of steps in the operation of the digital feedback unit with regard to the operation of a third switching unit associated with an electromagnetic brake.

Additionally, referring to FIG. 10, the feedback system 56 may be extended to encompass the switches 80 of the electromechanical brake system 54 as well. The digital output signals provide the required information to detect a failure of any of the switches 80. The different feedback values are read and interpreted by the safety controller (step 164) during the self-check process to identify defective switches (steps 170,172,174,176).

In operation, the safety controller 48 may detect the fault through the feedback signals 84A,84B,94A,94B and, in response, change the active-low control signals to high and thereby close the switches 68A,68B of the first and second switching units 64A,64B to short-circuit the motor windings 58 and open the switches 80 of the third switching unit 76 to engage the electromechanical brake 78. Because the plurality of switching units 64A,64B,76 are independent of each other, the failure of one to function properly does not prevent the others from functioning to brake the motor 42.

In one implementation, the system may use one motor controller and one safety controller to control multiple motors and multiple safety switching systems, with each motor having its own safety switching system. From the perspective of each motor, the system may function substantially similar or identical to the embodiments and implementations described above.

Figure 11:
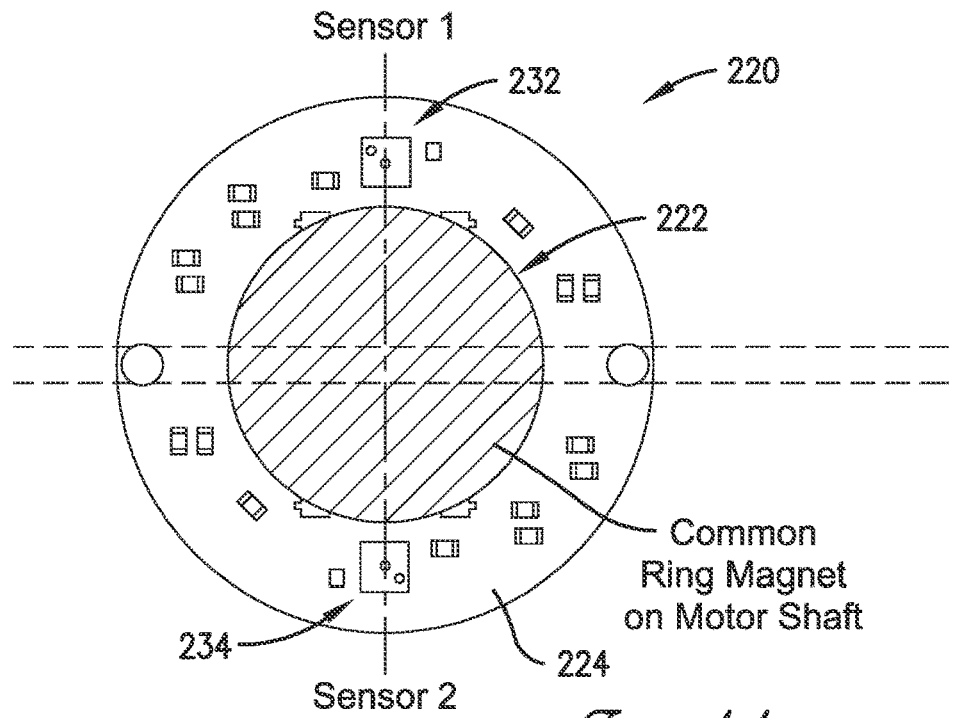
FIG. 11 is a first side view depiction of a dual encoder system for use on an electric motor to generate feedback information, showing a ring magnet component on a shaft of the electric motor.
Figure 12:
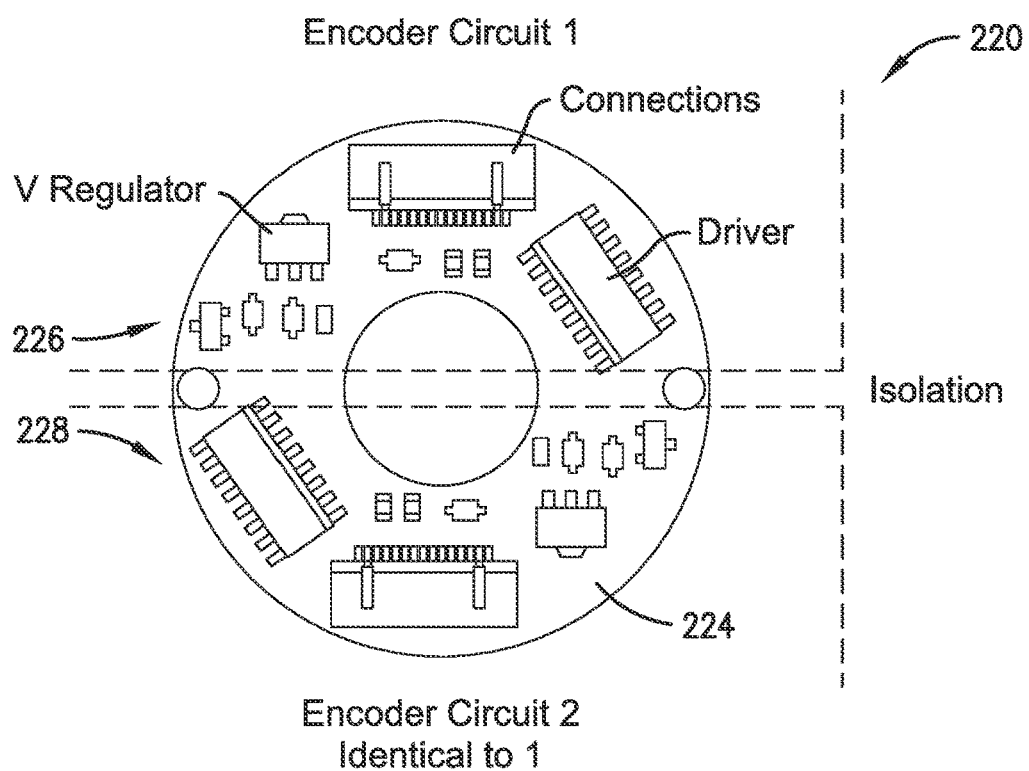
FIG. 12 is a second side view depiction of the dual encoder system of FIG. 11, showing first and second encoder components on a single PCB.
Figure 13:
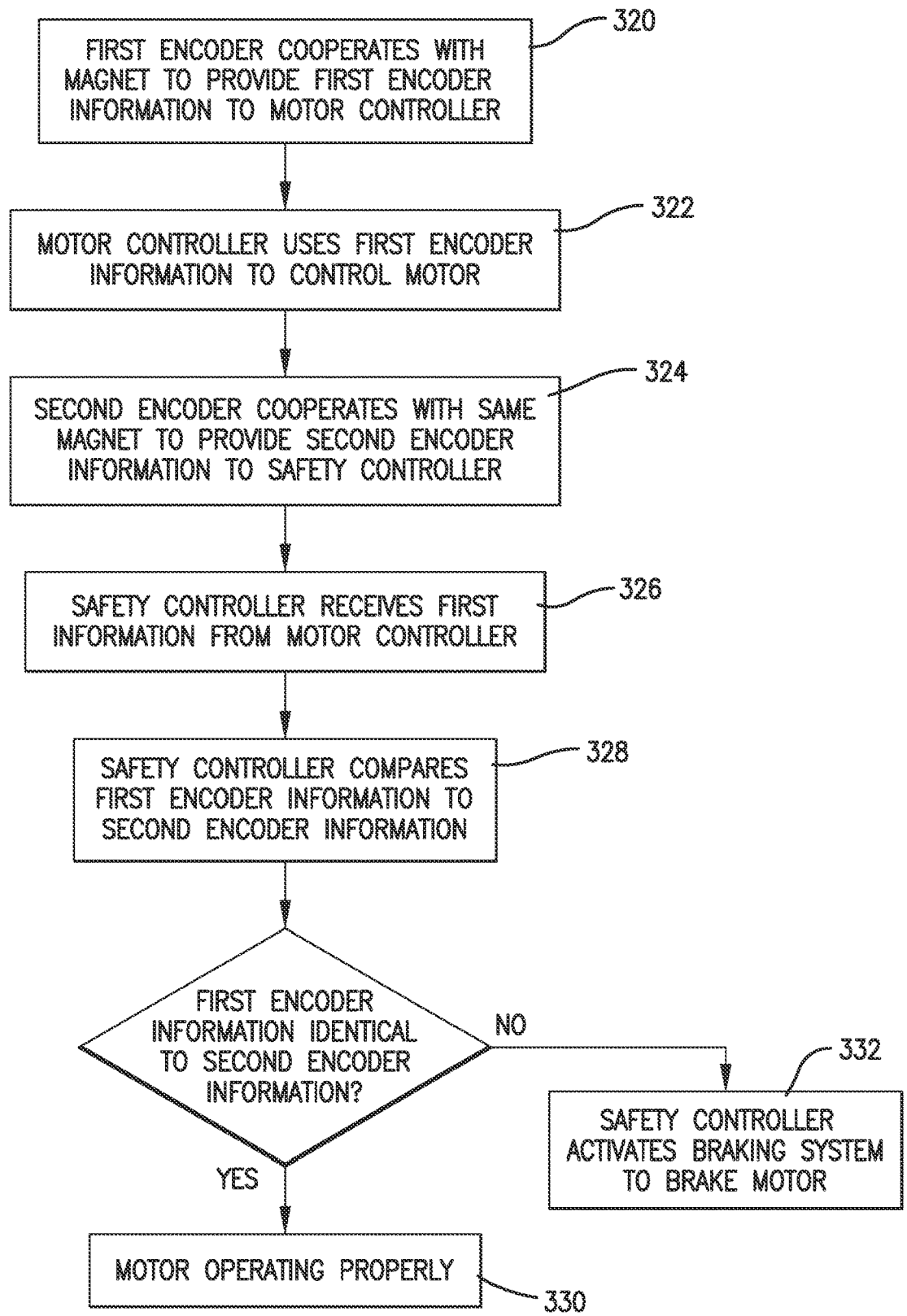
FIG. 13 is a flowchart of steps in example operation of the dual encoder system of FIGS. 11 and 12.

Referring also to FIGS. 11-13, embodiments of the present invention provide a dual encoder system 220 for use on an electric motor to generate feedback information, including fully redundant position, velocity, and commutation data, on a single PCB and using a single magnet, wherein the information may be used for controlling the motor. In one implementation, the dual encoder system 220 may be used with embodiments and implementations of the mobile device 60 and/or the safety switching system 40 described above. For example, the dual encoder system 220 may be used with the mobile device 60 including the electric motor 42 including the rotor, the plurality of stator windings 58, and a shaft, the motor controller 46 configured to provide power to and electronically control operation of the motor 42, the safety controller 48, and the safety switching system 40 as described above. The mobile device 60 may be, for example, a mobile robot or an automated guided vehicle.

The dual encoder system 220 may include a single magnet 222, a single PCB 224, a first encoder 226, and a second encoder 228. The single magnet 222 may be mounted on the shaft of the motor 42, and may be configured to produce a magnetic field which is sensible by both the first and second encoders 226,228. In one implementation, the single magnet 222 may be a ring magnet mounted on the shaft. The single PCB 224 may be mounted on the motor 42, such as on a back of the motor 42, and may be configured to physical support both the first and second encoders 226,228. Indirect mounting of the PCB 224 on the motor 42 is also within the ambit of the present invention.

The term "single" as used herein with respect to the magnet 222 and PCB 224 simply means that only one (1) magnet and only one (1) PCB are necessary or associated with the encoders 226,228 to provide the functionality of the system 220, as described herein. That is to say, the motor 42 may be provided with other magnets and/or PCBs for other purposes, without departing from the scope of the present invention.

The first encoder 226 may be mounted on the single PCB 224, and may be configured to operationally cooperate with the single magnet 222 to generate and provide first encoder information to the motor controller 46 regarding one or more operational characteristics of the motor 42, such as a magnetic alignment between the rotor and the stator windings 58 of the motor 42, which may be used to commutate the motor 42, and real-time position and velocity, which may be used by motor control algorithms. The first encoder 226 may include a first Hall effect sensor 232. For incremental encoders the information may be transmitted as AB quadrature encoded, commutation (UVW), and/or Hall effect signals, and for absolute encoders the signals may use a serial communications bus interface such as SPI, SSI, CANOpen, or EnDat.

The second encoder 228 may be also be mounted on the same single PCB 224, and may be configured to operationally cooperate with the same single magnet 222 to generate and provide second encoder information to the safety controller 48 regarding the one or more operational characteristics of the motor 42, such as magnetic alignment between the rotor and the stator windings 58 of the motor 42 and the real-time position and velocity. The second encoder may include a second Hall effect sensor 234. When the system is operating properly, the first encoder information should be approximately identical to the second encoder information.

In various implementation, the encoders 226,228 may be incremental encoders or absolute encoders. The first and second encoders 226,228 may be independently calibrated and separately connected to a power source and an electrical ground. The first encoder 226 may be aligned one hundred and eighty degrees from the second encoder 228 (as seen in FIG. 12) to synchronize the first encoder information and the second encoder information.

Referring particularly to FIG. 13, in operation, the first encoder 226 may cooperate with the magnet 222 to generate and provide the first encoder information to the motor controller 46, as shown in 320. The motor controller 46 may use the first information to control the motor 42, as shown in 322. The second encoder 228 may cooperate with the magnet 222 to generate and provide the second encoder information to the safety controller 48, as shown in 324. The safety controller 48 may receive the first encoder information from the motor controller 46, as shown in 326, and compare the second encoder information to the first encoder information, as shown in 328. If the first and second encoder information is approximately identical, then the motor 42 is operating properly, as shown in 330.

If the first encoder information is different from the second encoder information, then the safety controller 48 may brake the motor 42, as shown in 332. For example, as described above, the safety controller 48 may brake the motor 42 by activating the STO system 50 which brakes the motor 42 by disabling the motor controller 46 and thereby removing power from the motor 42 and causing it to slow due to a load torque and a friction effect. Additionally or alternatively, the safety controller 48 may brake the motor 42 by activating the multi-phase shorting system 52 which brakes the motor 42 by diverting power from the plurality of stator windings 58 of the motor 42. Additionally or alternatively, the safety controller 48 may brake the motor 42 by activating the electromechanical brake system 54 configured to mechanically brake the motor 42.

In one implementation, the safety controller 48 may perform progressive multi-stage braking of the motor 42 by activating the STO system 50 to disable the motor controller 46 to cause the motor 42 to coast to a stop; after a first delay period, activate the multi-phase shorting system 52 to divert power from the stator windings 58 of the motor 42 and thereby shorten a time period required for the motor 42 to stop; and after a second delay period, activate the electromechanical brake system 54 to mechanically brake the motor 42 and thereby further shorten the time period required for the motor 42 to stop. Additional features of the safety switching system 40 may be used with the dual encoder system 220.

Figure 14:
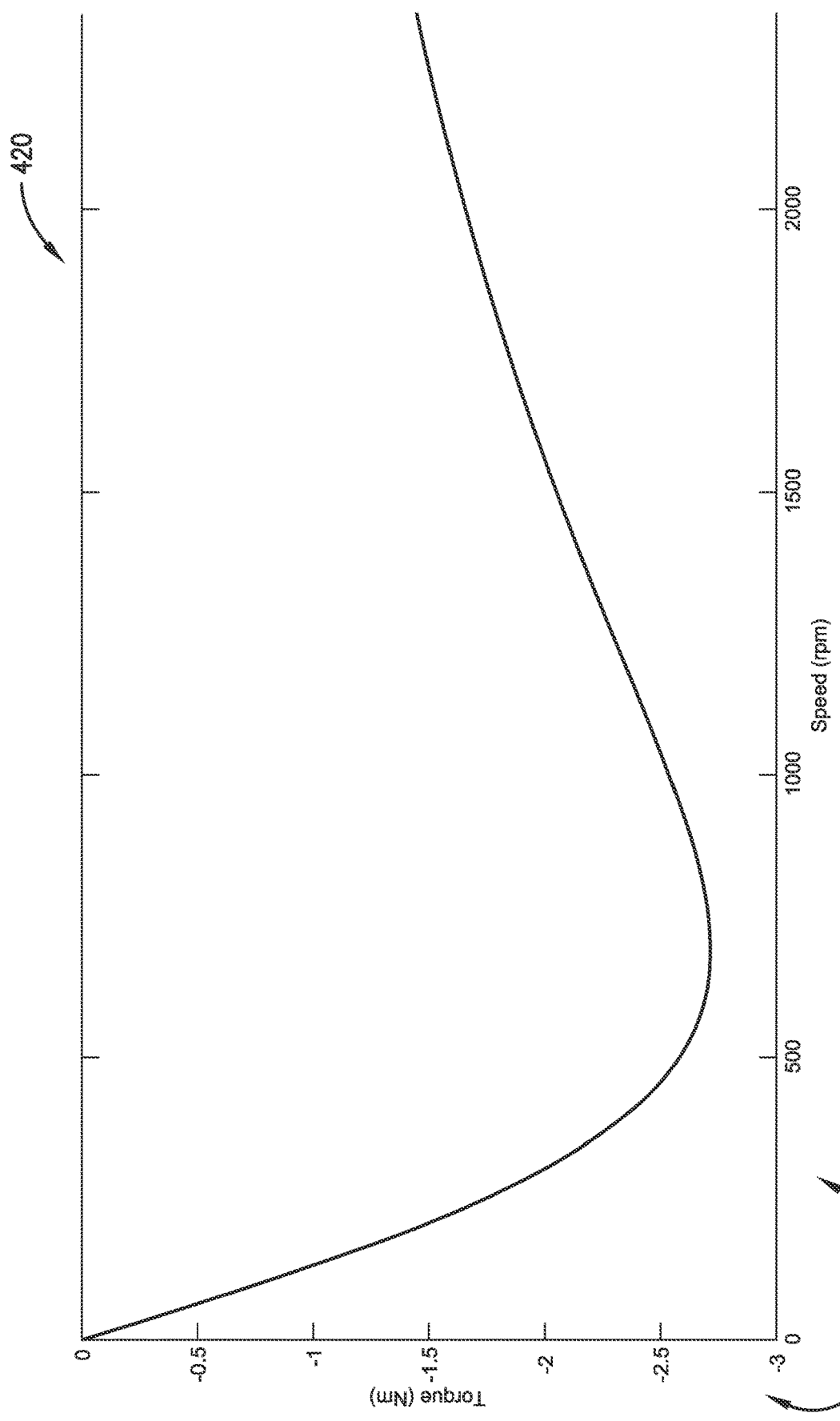
FIG. 14 is a graph of the speed of an electric motor versus the braking torque generated during a conventionally implemented multi-phase short braking.

Referring also to FIGS. 14-17, embodiments of the present invention provide a system and method for improving braking under multi-phase shorting of an electric motor by employing braking resistors and pulse width modulating bypass switches to adapt an equivalent average stator resistance to optimize braking torque through most or all of the deceleration speed range. Referring particularly to FIG. 14, which is a graph 420 of the speed 422 of an electric motor versus the braking torque 424 generated during a conventionally implemented multi-phase short braking, the generated braking torque is not constant and lower torque values occur in the high-speed region while maximum generated braking torque occurs in the low-speed region. Speed response and generated braking torque are highly affected by the motor parameters which affect the deceleration ramp under a multi-phase short condition, and the maximum generated braking torque is expected in the low-speed region. In more detail, as the speed increases the motor inductance shows higher impedance than the motor resistance ($\omega L \gg R$), and short circuit current has a lag relatively to the motor back electromotive force (BEMF). So the active power at low speeds is converted to re-active power at high speeds and the braking torque is reduced, exhibiting a non-linear waveform which highly depends on motor parameters.

Embodiments modify the reactive motor-generated power to active during multi-phase shorting and outperform constant multi-phase shorting because higher and optimized torque is achieved with lower peak transient current values during the active state. Broadly, controlled power switches selectively connect braking resistors to the motor stator, and the equivalent resistance is optimized by high speed power switches which selectively bypass the braking resistors. The optimal effective stator resistance is determined by motor speed, wherein higher speeds require more resistance and lower speeds require less resistance to achieve maximum power transfer and induced braking torque, and embodiments vary the stator resistance to achieve high braking performance at all speeds. A controller monitors speed feedback and, based at least in part thereon, generates pulse width modulated (PWM) signals to open and close the bypass switches. More specifically, the effective average resistance is achieved by pulse width modulating the bypass switches which allows the controller to create and adapt the equivalent average resistance to achieve optimal braking. In one implementation, speed feedback is provided to the controller, and the speed feedback sensor may be a motor encoder or the dual safety encoder system 220 described above. Another implementation may use an open feedback loop.

Figure 15:
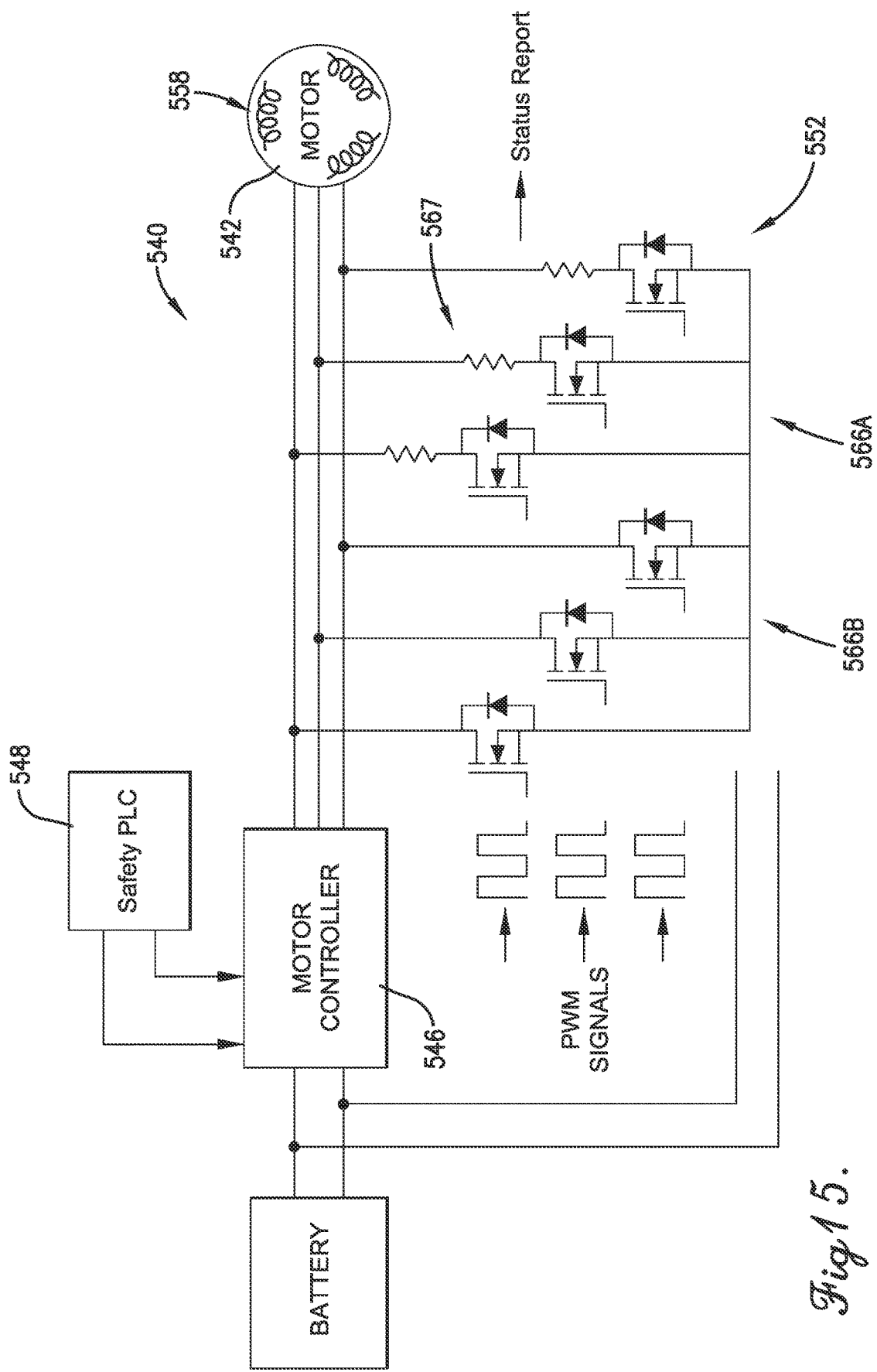
FIG. 15 is a block diagram of an embodiment of a system for improving braking under multi-phase shorting of an electric motor.

Referring to FIG. 15, an embodiment of a system 540 is shown for improving multi-phase short braking of an electric motor 542. The system 540 may include the motor 542 having a stator including a plurality of stator windings 558, a motor controller 546, and an embodiment of a multi-phase shorting system 552 including a plurality of first power switches 566A, a plurality of power braking resistors 567, a plurality of second power switches 566B, and an electronic controller 548. The number of windings 558, first switches 566A, braking resistors 567, and second switches 566B may depend on the number of phases, which will typically be three (3). Unless otherwise noted, certain components (for example, the motor 542 and motor controller 546) or aspects of certain components of the system 540 may be substantially physically and/or functionally similar or identical to the corresponding components of one or more of the above-described embodiments.

The plurality of first power switches 566A may be connected between the motor windings 558 and electrical ground and in electrical series with the power braking resistors 567, and configured to selectively close to connect the power braking resistors 567 to the circuit. The opening and closing of the first switches 566A may be controlled by the electronic controller 548.

The plurality of second power switches 566B may be connected between the motor windings 558 and electrical ground, and configured to selectively close to achieve multi-phase shorting and thereby brake the motor 542 as described above. When the second switches 566B are closed, the braking resistors 567 are bypassed (i.e., effectively removed from the circuit). The opening and closing of the second switches 566B may be controlled by the electronic controller 548 using PWM signals. The first and second switches 566A,566B may be substantially any suitable power transistors, such as MOSFETs, Gallium Nitride field effect transistors (GaN_FETs), or insulated-gate bipolar transistors (IGBTs).

The electronic controller 548 may be configured to generate and send to the first switches 566A signals which close the first switches 566A, and to receive feedback regarding the speed of the motor 542, and based at least in part thereon, to generate and send to second switches 566B the PWM signals which selectively open and close the second switches 566B and thereby respectively connect and disconnect the braking resistors 567 in such a manner as to achieve an optimal equivalent average stator resistance for the current speed of the motor 542 and thereby maximize power transfer to the braking resistors 567 and optimize braking torque through most or all of the deceleration speed range. When braking is not being implemented, both pluralities of switches 566A,566B remain off, or open. In one implementation, some or all of the functions of the electronic controller 548 may be performed by the safety controller described above, while in another implementation, the electronic controller 548 may be a different device, located internally (i.e., within the same housing or attached thereto or otherwise in close physical proximity therewith) or externally.

More broadly, the electronic controller and its functions may be variously implemented as follows. In a first configuration, the electronic controller may be externally located. The external electronic controller may send the PWM signals to the switches that control the motor phases short to ground. The external electronic controller may receive feedback from the dual safety encoder, and may also cross-check this information with the motor controller information. If this cross-check reveals a difference in measured speed then braking may begin.

In a second configuration, the electronic controller may be internally located. For example, the electronic controller may be a microcontroller unit located inside the safety switch. The internal electronic controller may send the PWM signals to the first and second switches. The safety switch may receive safety signals from a separate electronic controller (for example, the safety controller) and may receive feedback from the encoder and, using the internal electronic controller, generate the PWM signals for the switches. Further, rather than using feedback from the encoder, the internal electronic controller may use observers to estimate the speed.

In a third configuration, the electronic controller may be replaced by a hardware closed loop to switch on and off the first and second switches. The safety switch may receive safety signals from a separate electronic controller (for example, the safety controller). This configuration may not use an external encoder.

Figure 16:
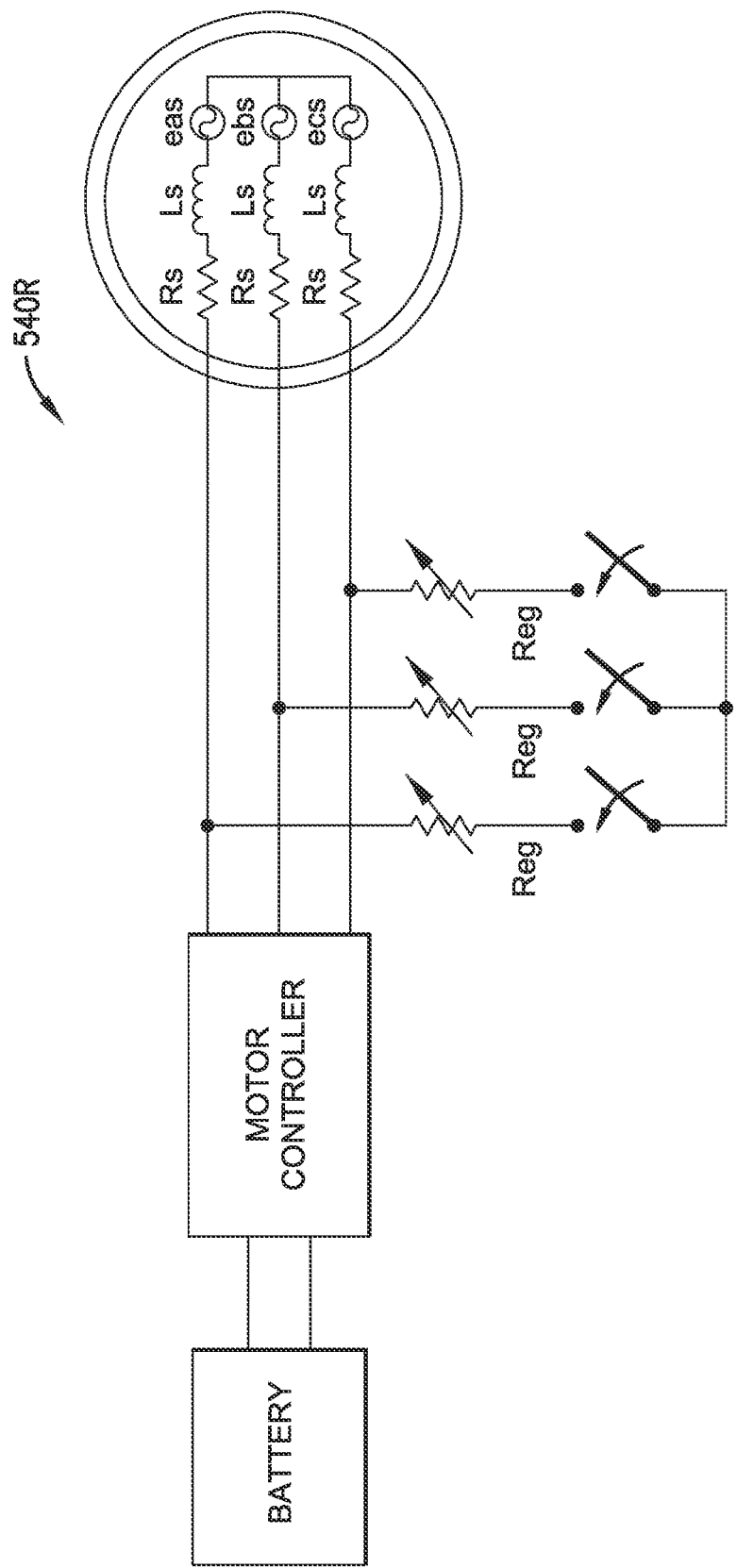
FIG. 16 is a block diagram of a functionally equivalent representation of the system of FIG. 15.

Referring to FIG. 16, the system 540 of FIG. 15 can be functionally reduced to the representative system 540R shown. In more detail, the equivalent series resistance may be adapted to the motor speed in order to maximize the generated braking torque. Using PWM, the equivalent series resistance ($R_{eq}$) can be described by equation (1) considering the equivalent different values of the external braking resistors ($R'_{br}$) according to the speed-based pulse width ($\delta$).

$$\begin{cases} R_{eq}^{min} = R_s + R_{DSon} \\ R_{eq} = R_s + R'_{br} \\ R_{eq}^{max} = R_s + R_{br} + R_{DSon} \end{cases} \quad (1)$$

where $R_s$ is the stator resistance, $R_{DSon}$ is the switch internal resistance, and $R_{br}$ is the value of the externally connected external power resistor.

The average value of the external power resistor is affected by the selected pulse width, as it is presented in equation (2).

$$R_{br}' = R_{br}(1-\delta), \text{ where } 0 \leq \delta \leq 1 \quad (2)$$

Neglecting the power switch on-state resistance, the pulse width can be varied according to equation (3), requiring only knowledge of the motor parameters and the actual motor speed.

$$\delta = 1 + \frac{R_s - pp * \omega \sqrt{L_d L_q}}{R_{br}} \quad (3)$$

The motor speed can be estimated using any suitable techniques, including but not limited to a speed/position sensor and back-EMF and phase currents zero crossing techniques.

It may be desirable to determine the value of the braking resistors 567 based on equation (4) prior to installation of the resistor into the system 540. However, the value of the braking resistors 567 could be selected from commercially available resistors, in which case the electronic controller 548 may adapt the pulse width to match the required equivalent series impedance.

$$R_{br}^{min} = pp * \omega \sqrt{L_d L_q} - R_s \quad (4)$$

Referring to FIG. 17, which is a graph 620 of the time 622 for which braking is applied versus the speed 624 of the motor, the speed responses are shown for both the conventionally implemented multi-phase short braking (shown in dashed line) and the improved multi-phase short braking (shown in solid line). Embodiments also outperform the conventionally implemented multi-phase short from the perspective of peak short circuit current value. The multi-phase short results in high transient current values which threaten the motor windings and permanent magnets. With the controlled PWM solution of the present invention, the peak transient current values are limited according to the external power resistor and the selected pulse width.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A multi-phase shorting system for braking an electric motor, the electric motor including a plurality of motor windings, the multi-phase shorting system comprising:
   a plurality of braking resistors, including at least one braking resistor for each of the plurality of motor windings;
   a plurality of first switches, including at least one first switch for each of the plurality of motor windings, with each first switch being a normally-closed switch connected between a respective motor winding and an electrical ground and in electrical series with the at least one braking resistor, and each first switch being configured to selectively close to connect the respective motor winding to the electrical ground through the at least one braking resistor;

a plurality of second switches, including at least one second switch for each of the plurality of motor windings, with each second switch being a normally-closed switch connected between a respective motor winding and the electrical ground, and the plurality of second switches being configured to selectively close to bypass the plurality of braking resistors and directly connect the plurality of motor windings to the electrical ground and thereby brake the electric motor by diverting power from the plurality of motor windings; and an electronic controller configured to receive feedback regarding a speed of the electric motor, and based at least in part thereon, to generate and send to the plurality of second switches a pulse width modulated signal which selectively opens and closes the plurality of second power switches and thereby respectively connects and disconnects the plurality of braking resistors to achieve a particular equivalent average stator resistance for the speed of the electric motor which results in a power transfer to the plurality of braking resistors and increases a braking torque through a deceleration speed range as the electric motor slows.

2. The multi-phase shorting system of claim 1, wherein the plurality of first switches and the plurality of second switches are metal oxide semiconductor field effect transistor switches.

3. The multi-phase shorting system of claim 1, wherein the electronic controller generates and sends the pulse width modulated signal to open the plurality of second switches for a longer time period when the speed of the electric motor is higher and for a shorter period of time when the speed of the electric motor is lower.

4. The multi-phase shorting system of claim 1, further including a feedback system configured to communicate to the electronic controller a switch failure of one or more of the plurality of first and second switches either as a short circuit fault or an open circuit fault, wherein if the switch failure occurs then the electronic controller activates the multi-phase shorting system and an electromechanical brake system to brake the electric motor.

5. The multi-phase shorting system of claim 4, wherein the feedback system is an analog feedback system configured to report a status of each of the plurality of first and second switches to the electronic controller as a first voltage indicating the switch failure has not occurred and a second voltage indicating the switch failure has occurred.

6. The multi-phase shorting system of claim 4, wherein the feedback system is a digital feedback system configured to report a status of each of the plurality of first and second switches to the electronic controller as a high value indicating the switch failure has not occurred and a low value indicating the switch failure has occurred.

7. A multi-phase shorting system for braking an electric motor, the electric motor including a plurality of motor windings, the multi-phase shorting system comprising:

a plurality of braking resistors, including at least one braking resistor for each of the plurality of motor windings;

a plurality of first power switches, including at least one first power switch for each of the plurality of motor windings, with each first power switch being a normally-closed solid state switch connected between a respective motor winding and an electrical ground and in electrical series with the at least one braking resistor, and each first power switch being configured to selectively close to connect the respective motor winding to the electrical ground through the at least one braking resistor;

a plurality of second power switches, including at least one second power switch for each of the plurality of motor windings, with each second power switch being a normally-closed solid state switch connected between a respective motor winding and the electrical ground, and the plurality of second power switches being configured to selectively close to bypass the plurality of braking resistors and directly connect the plurality of motor windings to the electrical ground and thereby brake the electric motor by diverting power from the plurality of motor windings; and an electronic controller configured to receive feedback regarding a speed of the electric motor, and based at least in part thereon, to generate and send to the plurality of second power switches a pulse width modulated signal which selectively opens and closes the plurality of second power switches and thereby respectively connects and disconnects the plurality of braking resistors to achieve a particular equivalent average stator resistance for the speed of the electric which results in a power transfer to the plurality of braking resistors and increases a braking torque through a deceleration speed range as the electric motor slows, wherein the electronic controller generates and sends the pulse width modulated signal to open the plurality of second power switches for a longer time period when the speed of the electric motor is higher and for a shorter period of time when the speed of the electric motor is lower.

8. The multi-phase shorting system of claim 7, wherein the plurality of first power switches and the plurality of second power switches are metal oxide semiconductor field effect transistor switches.

9. The multi-phase shorting system of claim 7, further including a feedback system configured to communicate to the electronic controller a switch failure of one or more of the plurality of first and second power switches either as a short circuit fault or an open circuit fault, wherein if the switch failure occurs then the electronic controller activates the multi-phase shorting system and an electromechanical brake system to brake the electric motor.

10. The multi-phase shorting system of claim 9, wherein the feedback system is an analog feedback system configured to report a status of each of the plurality of first and second power switches to the electronic controller as a first voltage indicating the switch failure has not occurred and a second voltage indicating the switch failure has occurred.

11. The multi-phase shorting system of claim 9, wherein the feedback system is a digital feedback system configured to report a status of each of the plurality of first and second power switches to the electronic controller as a high value indicating the switch failure has not occurred and a low value indicating the switch failure has occurred.

12. A system comprising:

an electric motor including a plurality of motor windings;

a motor controller configured to provide power to and electronically control operation of the electric motor; and a multi-phase shorting system configured to brake the electric motor, the multi-phase shorting system including— a plurality of braking resistors, including at least one braking resistor for each of the plurality of motor windings, a plurality of first power switches, including at least one first power switch for each of the plurality of motor windings, with each first power switch being a normally-closed solid state switch connected between a respective motor winding and an electrical ground and in electrical series with the at least one braking resistor, and each first power switch being configured to selectively close to connect the respective motor winding to the electrical ground through the at least one braking resistor, a plurality of second power switches, including at least one second power switch for each of the plurality of motor windings, with each second power switch being a normally-closed solid state switch connected between a respective motor winding and the electrical ground, and the plurality of second power switches being configured to selectively close to bypass the plurality of braking resistors and directly connect the plurality of motor windings to the electrical ground and thereby brake the electric motor by diverting power from the plurality of motor windings, and an electronic controller configured to receive feedback regarding a speed of the electric motor, and based at least in part thereon, to generate and send to the plurality of second power switches a pulse width modulated signal which selectively opens and closes the plurality of second power switches and thereby respectively connects and disconnects the plurality of braking resistors to achieve a particular equivalent average stator resistance for the speed of the electric which results in a power transfer to the plurality of braking resistors and increases a braking torque through a deceleration speed range as the electric motor slows, wherein the electronic controller generates and sends the pulse width modulated signal to open the plurality of second power switches for a longer time period when the speed of the electric motor is higher and for a shorter period of time when the speed of the electric motor is lower.

13. The system of claim 12, wherein the plurality of first power switches and the plurality of second power switches are metal oxide semiconductor field effect transistor switches.

14. The system of claim 12, the multi-phase shorting system further including a feedback system configured to communicate to the electronic controller a switch failure of one or more of the plurality of first and second power switches either as a short circuit fault or an open circuit fault, wherein if the switch failure occurs then the electronic controller activates the multi-phase shorting system and an electromechanical brake system to brake the electric motor.

15. The system of claim 14, wherein the feedback system is an analog feedback system configured to report a status of each of the plurality of first and second power switches to the electronic controller as a first voltage indicating the switch failure has not occurred and a second voltage indicating the switch failure has occurred.

16. The system of claim 14, wherein the feedback system is a digital feedback system configured to report a status of each of the plurality of first and second power switches to the electronic controller as a high value indicating the switch failure has not occurred and a low value indicating the switch failure has occurred.

* * * * *